Sept. 13, 1938.  C. P. SORENSEN  2,129,747
ELECTRIC CIRCUIT ALTERNATOR
Filed April 2, 1936   2 Sheets-Sheet 1

Inventor:
Carl P. Sorensen.
by Charles O. Sherwey
his Atty.

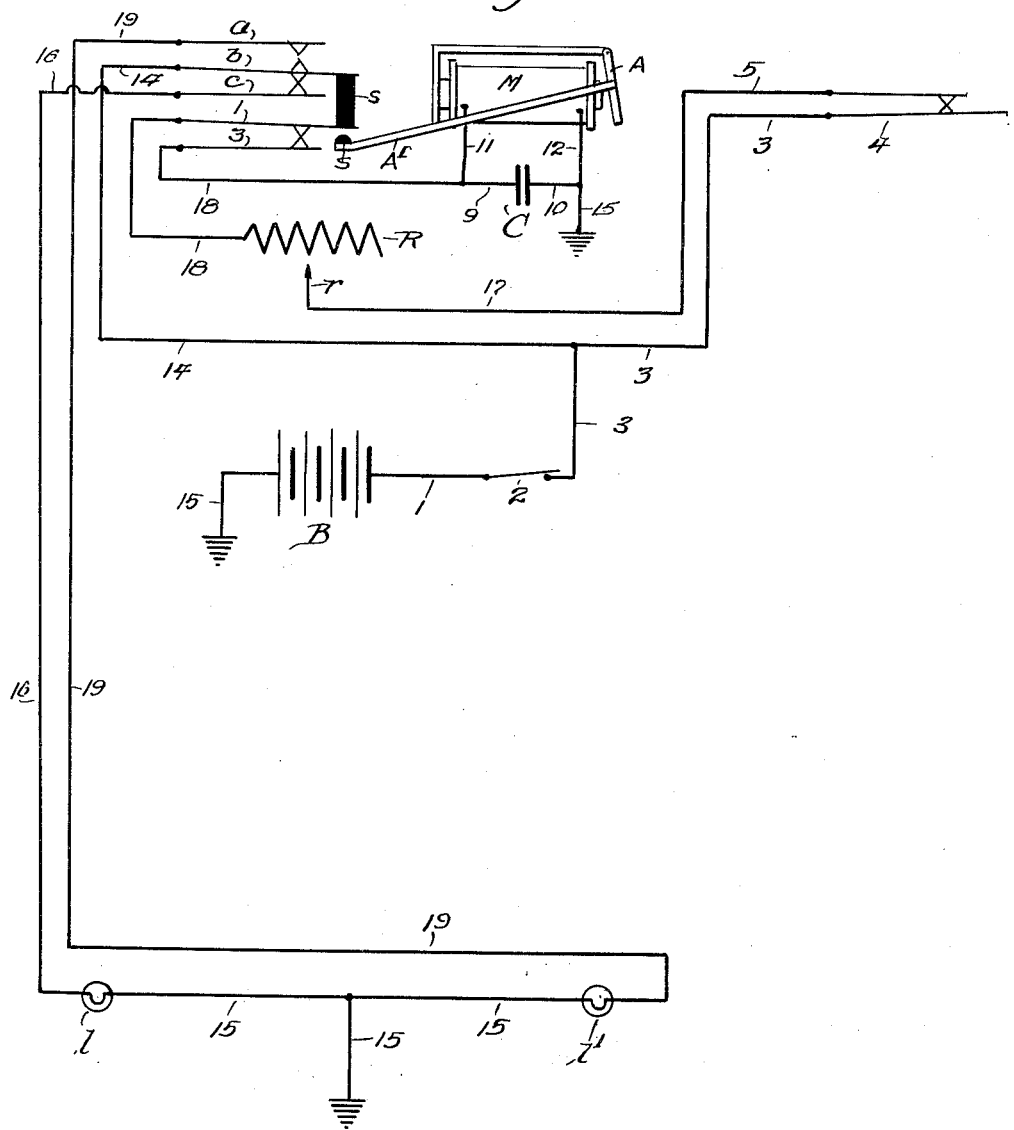

Patented Sept. 13, 1938

2,129,747

UNITED STATES PATENT OFFICE 2,129,747

ELECTRIC CIRCUIT ALTERNATOR

Carl P. Sorensen, Chicago, Ill.

Application April 2, 1936, Serial No. 72,279

8 Claims. (Cl. 175—373)

This invention relates to electric circuit alternators and part of the subject matter thereof is a continuation of my application on Vehicle signaling system, filed January 10, 1934, under Serial No. 706,007, now Patent No. 2,048,715, dated July 28, 1936.

The principal object of the present invention is the provision of novel all electric means for alternately transferring the circuits from a suitable source of electric supply, to two-load units, for instance, two electric lamps or two sets of lamps, whereby they are alternately energized for short periods of duration. For signaling purposes, it has been found that a continuously illuminated lamp is less likely to be observed than a pair of lamps that are illuminated alternately in fairly rapid succession.

Another object is the provision of all electric means whereby the timing of the alternations may be controlled regardless of the electric current fluctuations from the source of electric supply.

Another object is the provision of means for initiating the operation of the magnet coil of the mechanism, especially when its potential is low.

Another object is the provision of means whereby to disable the alternating mechanism so as to permit only one of the load units to remain constantly energized.

Another object is to provide a simple alternator which is not likely to get out of order when subjected to shocks and vibrations which occur when the apparatus is applied to motor vehicles.

With these and other objects and advantages in view, this invention consists in the several novel features hereinafter fully set forth and claimed.

The invention is clearly illustrated in the drawings accompanying this specification, in which:

Fig. 3 is a diagrammatic view illustrating another form of the invention.

Figure 1:
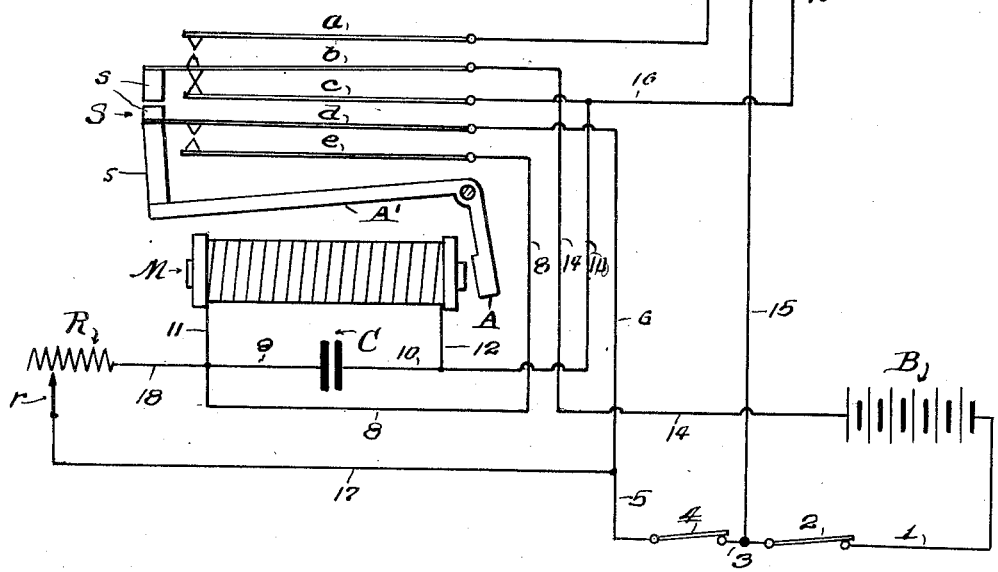
Fig. 1 is a diagrammatic view, illustrating a simple form of an electric circuit alternator, showing the parts in one position occupied during operation.
Figure 2:
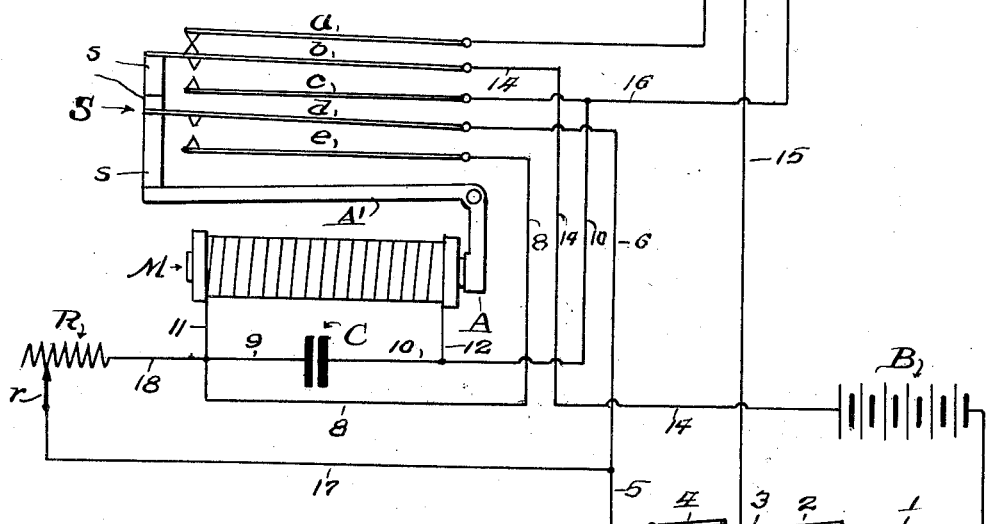
Fig. 2 is a view, similar to Fig. 1 and showing the parts in the other position occupied during operation

In the system illustrated in Figs. 1 and 2 of the drawings, the source of electrical supply is shown in the form of a battery B, although any suitable source of electrical energy may be used.

The reference character L designates the load, composed of two load units $l$, $l^1$, which may be in the form of any electric apparatus which requires electric current to be supplied to the two units in alternate sequence. When used as a signaling apparatus, the load may comprise electric lamps, either two lamps or two sets of lamps.

In circuit with the battery B, is the magnet coil M of an electro-magnetic device which has an armature A, from which projects the armature arm $A^1$. The armature arm serves to actuate an electric switch, here shown in the form of a jack leaf switch S, having contacts in the form of leaf jacks $a$, $b$, $c$, $d$, $e$, which control the load circuits and the magnet coil circuits. The electro-magnetic device and jack switch are of conventional form and require no detailed description, so far as this specification is concerned. The leaf jacks $b$, $d$, and armature arm $A^1$ are insulated from each other by insulating blocks $s$.

Connected across the magnet circuit is a condenser C, which serves to slow up the action of the electro-magnetic device, whereby instead of vibrating rapidly, the armature has short intervals of rest at the end of each stroke in either direction, so that the contacts are held closed or open for some little time, whereby the two load units are energized alternately for appreciable periods of duration.

In the magnet circuit, is a rheostat or variable resistance R, through which the input of potential to the condenser and magnet coil may be controlled. In the main circuit is a service switch 2, and in the control circuits for the alternator may be imposed a contact device 4, such as a time contact switch, a governor switch or a manually operated control switch, whereby said control circuits may be disabled.

The load circuits may be briefly described as follows: From one terminal of the battery B, a conductor I runs through the service switch 2 (when closed) and conductor 3, to conductor 15, which runs to one terminal of each load unit $l$, $l^1$, and from the other terminal of the load unit $l$, conductor 16 runs to contact $c$ of the electric switch S, and when contacts $b$, $c$, are closed, as in Fig. 1, the circuit is completed by conductor 14 which runs from contact $b$ to the other terminal of the battery B. Contact $b$ is a movable contact.

The circuit for the load unit $l^1$ continues from the other terminal thereof through conductor 19 to contact, $a$, and when the contacts $a$, $b$, are closed, as in Fig. 2, the circuit is completed through contacts $a$, $b$, and the conductor 14 which runs to the battery. Contact $b$ and conductor 14 are common to both load circuits.

It will be understood that by moving the movable contact, b, up and down, the circuits for the two load units are alternately closed. When the system is not in operation, the magnet coil M is deenergized and the armature falls back a trifle more than is shown in Fig. 1, permitting the contacts b, c, to close and also permitting the contacts d, e, to close.

During operation, the magnet coil M is never fully discharged so that the armature is not permitted to drop back far enough to permit the contacts, d, e, to make contact, but they are always held apart slightly, the purpose of which will be presently explained.

The magnet circuit runs from one terminal of the battery B, through service switch 2, through conductor 3, and contacting device 4, (when closed) through conductors 5, 17, to one terminal of the rheostat or variable resistance R, thence through conductors 18, 9, to the condenser C, and also through conductors 18, 11 to the magnet coil M; from the magnet coil runs a conductor 12, which joins with a conductor 10 that runs from the condenser to conductor 16, which runs to the contact c of the switch S, and when the contacts b, c, are in contact, the magnet circuit is completed through the conductor 14, which runs to the battery. It will be seen that the condenser C is connected across the magnet coil circuit through conductors 9, 11, 12, 10.

The rheostat or variable resistance R, is employed to control the timing of the operation of the electro-magnetic device. When the battery B is fully charged it is necessary, in order to slow up the action on the electro-magnetic device, to increase the resistance in the magnet circuit and this is done by moving the resistance contact, r, of the rheostat toward the left, as viewed in the drawings. When the resistance in the magnet circuit is high, it will take a relatively long interval of time to charge the condenser C, or the potential may be too low to saturate the magnet coil M, and for this reason an auxiliary circuit is provided for feeding full potential to the condenser and magnet coil at the commencement of operation.

The auxiliary circuit may be traced from the conductor 5, through conductor 6, to the contact, d, of the switch S, and when the apparatus is inoperative and the magnet coil is wholly discharged, contacts d, e, are in contact, and the circuit through the condenser and magnet coil is then completed from contacts d, e, through conductors 8, 9—11 and 12—10, conductor 16 to contact c, and b, (which are then closed) and from contact b, through conductor 14, back to the battery.

It will be understood that at the commencement of operation, the rheostat R is short circuited through contacts d, e, and the full input of potential is then fed to the condenser and magnet coil, through the auxiliary circuit, thereby starting the operation. As soon as the armature is attracted, the contacts d, e, are separated and remain separated continuously during the operation of the apparatus, because the magnet coil never becomes wholly discharged, but enough potential remains therein to partially attract the armature and thereby hold the contacts d, e, apart slightly. When this takes place the main magnet coil circuit becomes effective through the rheostat and remains effective until either switch 2 or 4 is opened.

In the operation of the system, with the service switch 2 and contacting device 4 closed, the load circuit is closed through contacts b, c, for the load 1 (see Fig. 1) and the condenser is initially saturated and the magnet coil energized through the auxiliary circuit. The armature is attracted by the magnet coil and its armature arm $A^1$ is moved upward, thereby opening contacts d, e, and disabling the auxiliary magnet circuit and also opening contacts b, c, and closing contacts a, b, (see Fig. 2), thereby opening the load circuit for the load 1, and closing the load circuit for the load unit $1^1$. When the armature arm is lifted the magnet circuit is thereby broken between contacts b, c, but the condenser continues to energize the magnet coil M until it is almost discharged, and when the magnet coil is almost deenergized, the armature drops back allowing contacts b, c, to close, thereby closing the circuit for the load unit 1. As above stated, the magnet coil does not become entirely deenergized and therefore it permits the armature to fall back only far enough to keep the contact d, e, from contacting, but permitting the contacts b, c, to contact.

From the above it will be understood that electric current from the source of supply is alternately fed to the load units 1, $1^1$, thereby causing them to be alternately energized, and when the load is in the form of lamps, they are alternately illuminated.

By opening the contacting device 4 the circuit for the electro-magnet device is opened, the magnet coil becomes deenergized and the armature falls back, thereby closing the contacts b, c, and thus closing the circuit for the load unit, 1, the circuit for the load unit $1^1$ being open between the contact a, b.

The form of the invention illustrated in Fig. 3 is exactly the same as that illustrated in Fig. 1 of my prior patent above referred to, except that the parts which have nothing to do with the present invention have been omitted therefrom. The same reference characters are applied to the elements of the apparatus illustrated in Fig. 3 as are applied to the corresponding elements in Figs. 1 and 2 of the accompanying drawings. The various elements are the same as the corresponding ones shown in Figs. 1 and 2, except that separate contacts 1, 3, are employed in the magnet circuit, whereas in Figs. 1 and 2 the contacts b, c, of the load circuit also control the magnet circuit.

The load circuit in the form of the invention illustrated in Fig. 3, is shown in the form of two electric lamps 1, $1^1$. The circuit for the lamp 1 may be traced from the battery B (which is grounded) through conductor 1, switch 2, conductor 3, 14 to leaf jacks b, c, and conductor 16 to the lamp 1 which is grounded. The circuit for the lamp $1^1$ may be traced from the battery B through conductor 1, switch 2, conductors 3, 14, leaf jacks b, a, conductor 19, back to lamp $1^1$, which is grounded.

The magnet circuit may be traced from the battery B through conductor 1, switch 2, conductor 3, contact device 4, conductors 5, 17, through rheostat R, conductor 18 to leaf jacks 1, 3, conductor 18, 11, to magnet M and conductors 12, 15, back to ground. Conductor 18 runs to the condenser C, through conductor 9 and from the condenser C, conductor 10 runs to conductor 15. Conductors 9, 10, 11, 12 comprise the holding circuit for the magnet, as in the other form of the invention.

The operation of this form of the invention is precisely the same as the corresponding circuits of the form shown in Figs. 1 and 2, and also the same as the corresponding circuit shown in my prior patent above referred to.

It is to be observed that both units of the load receive their potential from the same source, and that the circuits for the electro-magnetic device are independent of the load circuits so that the electric current is separately fed to the load and to the magnet coil and condenser from the main source of electricity.

The system above described has a great variety of uses, for instance, it may be used as a stationary signaling appartus on streets, road, highways and the like, to warn the public of dangerous places. It may be used on motor vehicles to warn drivers of approaching vehicles. When a vehicle, equipped with the apparatus, is traveling at low speed or standing still, the lamps will be illuminated alternately, thus readily attracting attention, and when the vehicle travels at high speed the circuit for the electro-magnetic device may be opened through the contacting device 4, thereby causing one lamp or one set of lamps only to be illuminated.

I claim as new and desire to secure by Letters Patent:

1. An electric circuit alternator comprising an electric switch, through which circuits for two load units are alternately closed and through which a magnet circuit is intermittently closed, all of said circuits having a common source of electric supply, a single electro-magnetic device in said magnet circuit, said electro-magnetic device having an armature arm for actuating the switch when the magnet is energized to thereby open one load circuit and close the other and simultaneously open the magnet circuit, and when de-energized, to close the open load circuit and open the closed one and simultaneously close the magnet circuit, and a condenser connected across the magnet circuit only, whereby the condenser feeds the magnet temporarily after the magnet circuit is broken, whereby the circuits for the load units are kept closed alternately for appreciable periods of duration.

2. An electric circuit alternator comprising an electric switch having stationary and movable switch contacts, through which circuits for two load units are alternately closed, and through which switch a magnet circuit is intermittently closed, all of said circuits having a common source of electric supply, a single electro-magnetic device in said magnet circuit, said electro-magnetic device having an armature arm for actuating the switch when the magnet is energized to thereby open one load circuit and close the other and simultaneously open the magnet circuit, and when de-energized, to close the open load circuit and open the closed one and simultaneously close the magnet circuit, and a condenser connected across the magnet circuit only, whereby the condenser feeds the magnet temporarily after the magnet circuit is broken, whereby the circuits for the load units are kept closed alternately for appreciable periods of duration.

3. An electric circuit alternator comprising an electric switch having stationary and movable contacts, through which circuits for two load units are alternately closed, the contacts for one load circuit also serving to open and close a magnet circuit, all of said circuits having a common source of electric supply, a single electro-magnetic device in said magnet circuit and having an armature arm for actuating the movable contact of the switch when the magnet is energized, to thereby open one load circuit and close the other and simultaneously open the magnet circuit, and when de-energized, to close the open load circuit and open the closed one and simultaneously close the magnet circuit, and a condenser connected across the magnet circuit only, whereby the condenser feeds the magnet temporarily after the magnet circuit is broken, whereby the circuits for the load units are kept closed alternately for appreciable periods of duration.

4. The combination of a jack switch having two stationary leaf jacks and a movable leaf jack therebetween, through which leaf jacks circuits for two load units are alternately closed, said switch having also a stationary leaf jack and a movable leaf jack, through which a magnet circuit is intermittently closed, the two load circuits and magnet circuits having a common source of electric supply, a single electro-magnetic device in said magnet circuit only, said electro-magnetic device having an armature arm arranged to actuate both movable contacts, when the magnet is energized, to thereby close one load circuit and open the other one and simultaneously open the magnet circuit, and when de-energized, to open the closed load circuit and close the open one and simultaneously close the magnet circuit, and a condenser connected across the magnet circuit and acting to temporarily feed the magnet when the magnet circuit is broken, whereby the load units are energized alternately for appreciable periods of duration.

5. An electric circuit alternator comprising an electric switch, through which circuits for two load units are alternately closed, and through which a magnet circuit is intermittently closed, all of said circuits having a common source of electric supply, a single electro-magnetic device in said magnet circuit, said electro-magnetic device having an armature arm for actuating the switch when the magnet is energized, to thereby open one load circuit and close the other and simultaneously open the magnet circuit, and when de-energized, to close the open load circuit and open the closed one, and simultaneously close the magnet circuit, a condenser connected across the magnet circuit only, whereby the condenser feeds the magnet temporarily after the magnet circuit is broken, whereby the circuits for the load units are kept closed alternately for appreciable periods of duration, and a variable resistance element in the magnet circuit.

6. An electric circuit alternator comprising an electric switch having stationary and movable contacts, through which circuits for two load units are alternately closed, the contacts for one load circuit also serving to open and close a magnet circuit, all of said circuits having a common source of electric supply, a single electro-magnetic device in said magnet circuit and having an armature arm for actuating the movable contact of the switch, when the magnet is energized, to thereby open one load circuit and close the other and simultaneously open the magnet circuit, and when de-energized, to close the open load circuit and open the closed one and simultaneously close the magnet circuit, a condenser connected across the magnet circuit only, whereby the condenser feeds the magnet temporarily after the magnet circuit is broken, whereby the circuits for the load units are kept closed alternately for appreciable periods of duration, and a variable resistance element in the magnet circuit.

7. In an electric circuit alternator, the combination of a switch through which circuits for two load units are alternately closed, and through which a magnet circuit is intermittently closed, all of said circuits having a common source of electric supply, a single electro-magnetic device in said magnet circuit, said electro-magnetic device having an armature arm arranged to close one load circuit and open the other and simultaneously open the magnet circuit, when the magnet is energized, a condenser connected across the magnet circuit, and a variable resistance element in said magnet circuit only, said switch having also contacts for an auxiliary magnet circuit, which, when the device is idle, close the auxiliary magnet circuit and short-circuit the resistance element, said armature arm, when the magnet is energized, operating to open the last mentioned contacts, and thereby keep the auxiliary magnet circuit open, whereby the resistance element is not short-circuited while the device is in operation.

8. An electric circuit alternator comprising an electric switch having stationary and movable switch contacts, through which circuits for two load units are alternately closed, and through which a magnet circuit is intermittently closed, the circuits of said load units and magnet having a common source of electric supply, a single electro-magnetic device in said magnet circuit, said electro-magnetic device having an armature arm arranged to close one load circuit and open the other and simultaneously open the magnet circuit when the magnet is energized, a condenser connected across the magnet circuit, a variable resistance element in said magnet circuit only, said switch having also contacts for an auxiliary magnet circuit, which, when the device is idle, close the auxiliary magnet circuit and short-circuit the resistance element, said armature arm, when the magnet is energized, operating to open the last mentioned contacts and thereby keep the auxiliary magnet circuit open, whereby the resistance element is not short-circuited while the device is in operation.

CARL P. SORENSEN.